(12) United States Patent
Somerfield et al.

(10) Patent No.: US 9,528,469 B2
(45) Date of Patent: *Dec. 27, 2016

(54) THRUST REVERSER ACTUATION

(75) Inventors: Michael Paul Somerfield, Stoke-on-Trent (GB); Benjamin Thomas Tucker, Wolverhampton (GB)

(73) Assignee: GOODRICH ACTUATION SYSTEMS LIMITED, Solihull (GB)

(*) Notice: Subject to any disclaimer, the term of this patent is extended or adjusted under 35 U.S.C. 154(b) by 1037 days.

This patent is subject to a terminal disclaimer.

(21) Appl. No.: 12/893,459

(22) Filed: Sep. 29, 2010

(65) Prior Publication Data

US 2011/0072780 A1   Mar. 31, 2011

(30) Foreign Application Priority Data

Sep. 29, 2009 (GB) .................................. 0917057.2

(51) Int. Cl.
*F02K 3/02* (2006.01)
*F02K 1/76* (2006.01)
*F16H 25/20* (2006.01)

(52) U.S. Cl.
CPC .......... *F02K 1/763* (2013.01); *F16H 25/2021* (2013.01); *Y02T 50/671* (2013.01)

(58) Field of Classification Search
CPC .......... F02K 1/763; F02K 1/766; F02K 1/76; F02K 1/56; F02K 1/64; F16H 25/2021; Y02T 50/671
USPC ... 60/226.2, 39.091; 74/89.23, 89.37, 89.39; 244/110 B
See application file for complete search history.

(56) References Cited

U.S. PATENT DOCUMENTS

| | | | | |
|---|---|---|---|---|
| 3,596,740 A | * | 8/1971 | Nau ................................ | 188/74 |
| 4,898,265 A | * | 2/1990 | Metcalf ....................... | 192/223.3 |
| 4,922,713 A | * | 5/1990 | Barbarin et al. ............. | 60/226.2 |
| 5,199,538 A | | 4/1993 | Fischer et al. | |
| 6,167,694 B1 | * | 1/2001 | Davies .......................... | 60/226.2 |
| 6,202,803 B1 | * | 3/2001 | Lang .............................. | 188/134 |
| 6,293,489 B1 | * | 9/2001 | Davies .......................... | 244/12.5 |
| 6,401,557 B1 | * | 6/2002 | Davies .......................... | 74/89.39 |
| 6,487,846 B1 | * | 12/2002 | Chakkera et al. ........... | 60/226.2 |
| 6,494,033 B1 | * | 12/2002 | Davies .......................... | 60/226.2 |

(Continued)

FOREIGN PATENT DOCUMENTS

| | | |
|---|---|---|
| EP | 1673529 | 12/2004 |
| EP | 1972548 | 9/2008 |

(Continued)

OTHER PUBLICATIONS

British Search Report dated Jan. 26, 2010.
European Search Report dated Mar. 18, 2011.

*Primary Examiner* — Gerald L Sung
(74) *Attorney, Agent, or Firm* — Cantor Colburn LLP

(57) ABSTRACT

A thrust reverser drive arrangement is described for use in driving a thrust reverser cowl for movement relative to first and second guide tracks, the drive arrangement comprising a first actuator located, in use, close to the first guide track, and a second actuator located, in use, close to the second guide track, the actuators being arranged to be driven in synchronism and at the same speed by a drive motor to drive the cowl for movement, wherein at least one of the first and second actuators is provided with a load limiter to limit the transmission of loads through that actuator in the event that that actuator is subject to a compressive loading greater than a predetermined level.

7 Claims, 4 Drawing Sheets

(56) References Cited

U.S. PATENT DOCUMENTS

| | | | |
|---|---|---|---|
| 6,526,744 B2 * | 3/2003 | Ahrendt | 60/204 |
| 6,622,963 B1 * | 9/2003 | Ahrendt et al. | 244/54 |
| 6,974,107 B2 * | 12/2005 | Christensen et al. | 244/101 |
| 7,513,101 B2 * | 4/2009 | Eschborn et al. | 60/204 |
| 7,919,938 B2 * | 4/2011 | Harvey et al. | 318/14 |
| 8,042,417 B2 * | 10/2011 | Davies et al. | 74/89.39 |
| 2004/0118974 A1 * | 6/2004 | Colotte et al. | 244/110 B |
| 2004/0188211 A1 | 9/2004 | Christensen | |
| 2010/0229528 A1 * | 9/2010 | Ramlaoui et al. | 60/226.2 |
| 2011/0016846 A1 * | 1/2011 | Maalioune | 60/226.2 |
| 2011/0232406 A1 * | 9/2011 | Somerfield et al. | 74/424.81 |

FOREIGN PATENT DOCUMENTS

| | | |
|---|---|---|
| EP | 1978233 | 10/2008 |
| GB | 2408725 | 6/2005 |
| GB | 2 418 719 | 4/2006 |
| WO | 2004113707 | 12/2004 |

\* cited by examiner

THRUST REVERSER ACTUATION

This invention relates to thrust reverser actuation and in particular to a drive arrangement suitable for use in driving a movable component, for example a cowl, of a thrust reverser system between stowed and deployed positions.

A typical thrust reverser system includes a pair of movable cowls, each being movable between a stowed position and a deployed position in which it is exposed to the airflow through the aircraft engine with which it is associated to apply a braking load to the aircraft. Each cowl is guided for movement along a pair of guide tracks, and is driven for movement by a plurality of linearly extendable actuators, for example in the form of screw jack actuators. Usually an actuator will be located relatively close to each of the guide tracks, and one or more intermediate actuators will be positioned between the aforementioned actuators. The actuators are arranged to be driven in synchronism, conveniently by a single motor, drive from which is transmitted to all of the actuators.

In order to prevent deployment of the thrust reverser system other than when desired a number of locks are built into the system. Typically, a track lock or tertiary lock for example in the form of a hook-type lock is provided whereby the cowl is locked against movement relative to the fixed structure of the nacelle, the track lock being released when deployment of the actuator is commanded. The track lock is usually designed so as to be able to hold the cowl against movement in the event of, for example, a control failure resulting in the drive motor operating, erroneously, to drive the cowl for movement. It will be appreciated that, in order to prevent movement of the cowl in such circumstances, the track lock needs to be of robust form.

If there is a failure in the control system resulting in attempted deployment of the cowl when the track lock is engaged, or a failure in the track lock resulting in the track lock not releasing, when desired, or if the cowl becomes jammed relative to one or other of the guide tracks during deployment, for example as a result of the presence of a tool, safety locking pin or other foreign body in the guide track, then it will be appreciated that the actuator adjacent that guide track will be subject, very suddenly, to a large compressive load as movement of the cowl is arrested. There is a risk that such loads could result in permanent damage to the actuator, for example in buckling of the output shaft thereof. Obviously, it is desirable to avoid such damage and the inconvenience and cost associated with having to make repairs after such damage has occurred. It is an object of the invention to provide an arrangement in which the disadvantages outlined hereinbefore are overcome or are of reduced effect.

It is known to incorporate a torque limiter device which releases upon the application of an excessive torque thereto into an actuator. For example, WO2004/113707 describes a design of actuator in which a torque limiter assembly is incorporated to limit the torque applied to the actuator.

GB2408725 and EP1972548 both describe actuator schemes in which a plurality of actuators are provided.

According to the present invention there is provided a thrust reverser drive arrangement for use in driving a thrust reverser cowl for movement relative to first and second guide tracks, the drive arrangement comprising a first actuator located, in use, close to the first guide track, and a second actuator located, in use, close to the second guide track, the actuators being arranged to be driven in synchronism and at the same speed by a drive motor to drive the cowl for movement, wherein at least one of the first and second actuators is provided with a load limiter to limit the transmission of loads through that actuator in the event that that actuator is subject to a compressive loading greater than a predetermined level.

Conveniently both the first actuator and the second actuator are provided with a load limiter.

With such an arrangement, in the event of a failure of the nature outlined hereinbefore, the load limiter will serve to limit the loadings experienced by the associated actuator, preferably reacting or earthing excess loadings through the housing thereof, thereby reducing the risk of permanent damage to the actuator.

Each actuator conveniently comprises a rotatable actuator member, rotatable by the motor, in use, the actuator member being coupled through a ball or roller-screw coupling to an output member, rotation of the actuator member driving the output member for axial movement, the load limiter being operable to apply a braking load to the actuator member to resist rotation thereof, thereby reacting applied motor torque to a housing of the actuator rather than increasing the compression of the output member.

The load limiter conveniently comprises bearing means supporting the actuator member for rotary motion relative to the housing, resilient biasing means permitting limited axial movement of the actuator member in the event of the application of excessive loadings to the actuator, and abutment means co-operable in the event of axial movement of the actuator member beyond a predetermined distance to transmit torque loadings between the actuator member and the housing.

The abutment means preferably comprises a first stop member secured, in use, to the actuator member and co-operable with a first abutment surface associated with the housing, and a second stop member secured, in use to the actuator member and co-operable with a second abutment surface associated with the housing. The bearing means is conveniently located between the first and second stop members, and the resilient biasing means conveniently comprises first and second disc spring packs interposed between the bearing means and the first and second stop members, respectively.

The first and second stop members are preferably each provided with fingers, the fingers of the first stop member being interleaved with those of the second stop member, the bearing means encircling the fingers, each finger including a lip at its free end co-operable with the bearing means to hold the first and second stop members captive to the bearing means.

Such a design of load limiter is advantageous in that it can be pre-assembled and tested, if desired, prior to introduction into the actuator.

The invention will further be described, by way of example, with reference to the accompanying drawings, in which.

Figure 1:
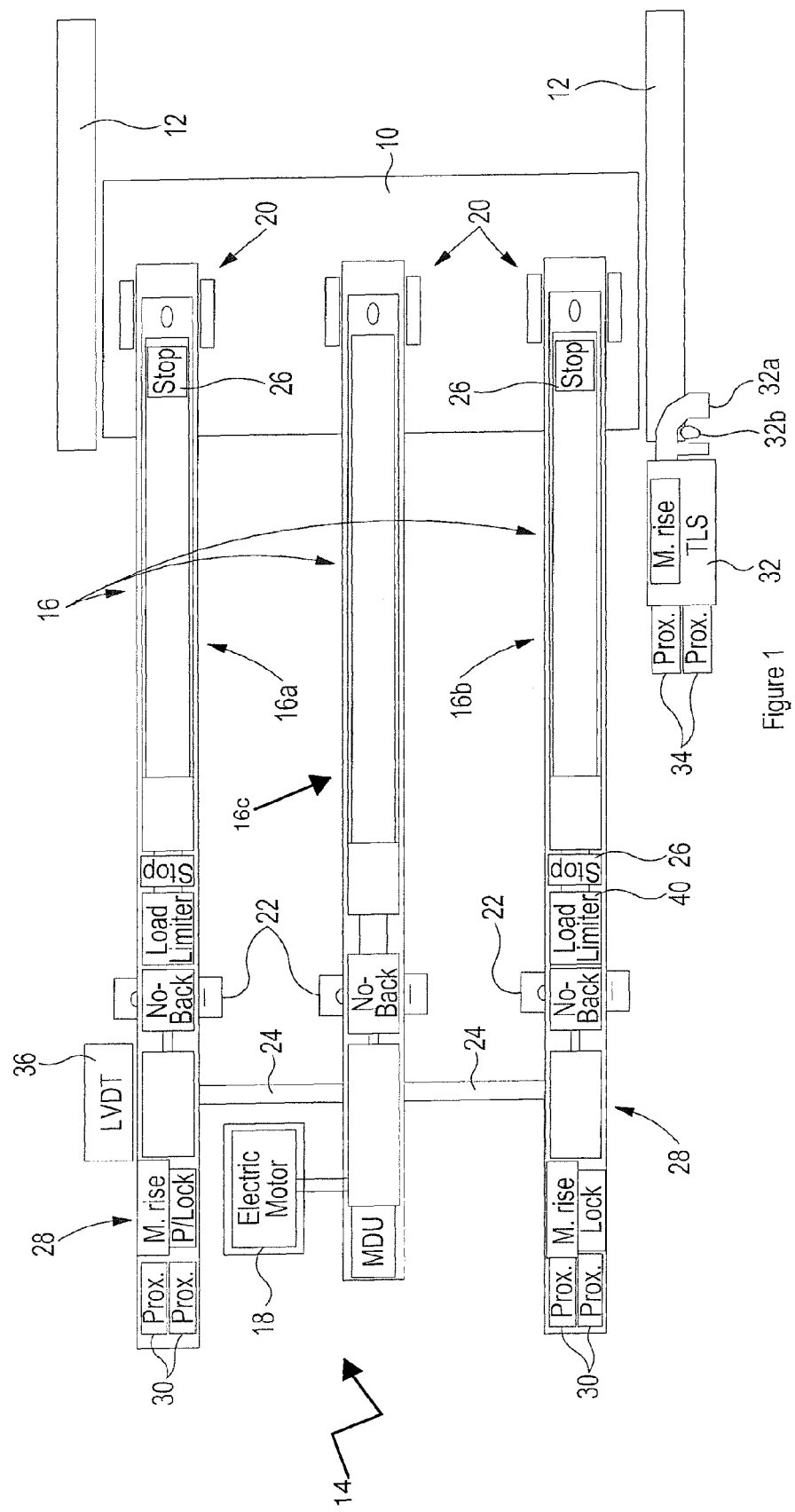
FIG. 1 is a diagrammatic view of a thrust reverser arrangement incorporating a drive arrangement in accordance with one embodiment of the invention.

FIG. 1 illustrates, diagrammatically, part of a thrust reverser system for use with an aircraft. The thrust reverser system comprises a cowl 10 guided for movement relative to an aircraft engine by a pair of guide tracks 12. The cowl 10 is arranged to be driven for movement along the guide tracks 12 by a drive arrangement 14 which comprises three linear actuators 16 arranged to be driven by a single, common electric motor 18. Each actuator 16 is in the form of a screw-jack actuator.

A first one of the actuators 16, actuator 16a, is located adjacent one of the tracks 12, a second one of the actuators 16, actuator 16b, being located adjacent the other of the tracks 12. Intermediate the first and second actuators 16a, 16b is located a third, intermediate actuator 16c. Each actuator 16 is secured by a respective mounting 20 to the cowl 10, and is also secured by gimbal mounting means 22 to a fixed part of the engine housing or wing structure (not shown).

The electric motor 18 is arranged to drive the third actuator 16c directly, and flexible drive transmission shafts 24 are arranged to transmit drive from the third actuator 16c to the first and second actuators 16a, 16b.

The first and second actuators 16a, 16b are substantially identical to one another and incorporate stops 26 operable to limit extending and retracting movement of the actuators 16a and 16b, lock arrangements 28 operable to lock these actuators against movement, and sensors 30 operable to output signals indicative of the operating status of the lock arrangements 28 to an associated control unit (not shown).

The thrust reverser system further comprises a track lock or tertiary lock 32 operable to lock the cowl 10 against movement relative to one of the tracks 12, the track lock 32 having sensors 34 associated therewith to output signals representative of the status of the track lock 32 to the control unit. The track lock 32 comprises a pivotally moveable hook member 32a which, in a locked condition retains a lock pin 32b secured to the cowl, to resist movement of the cowl 10. Lock arrangements of this general type are well known and so the track lock 32 will not be described herein in greater detail.

A position sensor in the form of an RVDT or an LVDT 36 monitors the operation of one of the actuators 16 to provide a signal indicative of the position of the actuators 16 and hence the cowl 10 for use by the control unit.

It is apparent from FIG. 1 that the third actuator 16c is of a different design to the first and second actuators 16a, 16b. This arises from the fact that the loadings experienced by the third actuator 16c are considerably smaller than those experienced by the first and second actuators 16, 16b, in use. As a consequence, the third actuator 16c can be of reduced size and weight compared to the first and second actuators 16a, 16b, thereby achieving a weight saving. There is also no need to provide the third actuator 16c with the stops 26, lock 28 or associated sensors 30, thereby achieving further weight and cost savings. As mentioned hereinbefore, the third, smaller and/or lighter actuator 16c is capable of withstanding only smaller loadings than can be withstood by the first and second actuators 16a, 16b.

In use, when deployment of the cowl 10 is required, the track lock 32 and locks 28 are instructed to release, and the outputs of the sensors 30, 34 are used by the control unit to determine that the system is unlocked. The motor 18 is then operated to drive the actuators 16, and hence the cowl 10, for movement.

As described hereinbefore, in the event that the motor 18 operates to drive the cowl 10 for deployment at a time when the track lock 32 is still engaged, for example as a result of a control system failure or resulting from a failure of the track lock 32, then the track lock 32 will operate to hold the cowl 10 against deployment. The nature of the track lock 32 is typically such that there is a clearance between the hook-shaped lock member 32a thereof and the associated lock pin 32b secured to the cowl 10 when the cowl is locked in its stowed position. This is advantageous in that wear of the components of the track lock 32, for example arising from vibrations, is reduced. However, as a result, if the motor 18 is operated to drive the cowl 10 for deployment at a time when the track lock is engaged, a small amount of extension of the actuators 16 and movement of the cowl 10 will occur before movement is arrested by the track lock 32, and during this period momentum will have built up, and the drive shafts 24 will have become stressed. Once this small amount of movement has occurred, further extension of the adjacent actuator 16 is suddenly prevented, and the continued application of motor drive to that actuator 16, in combination with the effects of the aforementioned momentum and stressing, will place that actuator 16 under a significant compressive load. In accordance with the invention, in order to avoid damage to the actuator 16, a load limiter device 40 is incorporated in the actuator 16, the load limiter device 40 being operable, under such conditions, to applying a braking load to the actuator 16, reacting the applied torque to the housing of the actuator 16 rather than attempting to continue extension of the actuator 16. It will be appreciated that the load limiter device 40 thus serves to reduce the risk of damage of the actuator in such circumstances.

Although the failure mode outlined hereinbefore involves deployment of the cowl at a time when the track lock is engaged, it will be appreciated that a number of other scenarios could have similar results. For example, if a maintenance tool or mechanical safety locking pin, or other foreign body, is located within one of the guide tracks 12 at a time when the cowl 10 is moved towards its deployed position, sudden arresting of the movement of the cowl 10, and corresponding arresting of the extension of the actuators 16 will occur, albeit with the cowl 10 in a part deployed, rather than stowed, position. Such arresting of the actuators 16 has much the same result as described hereinbefore, and the presence of the load limiter device 40 will serve to reduce the risk of actuator damage under such circumstances.

As the third actuator 16c is spaced by a relatively large distance from the guide tracks 12, slight flexing of the cowl 10 allows this actuator to decelerate at a lower rate than the first and second actuators 16a, 16b, thus damage thereto is less likely. Consequently, in the arrangement illustrated, the third actuator 16c is not provided with a load limiter 40. However, there may be circumstances in which this is desirable.

Figure 2:
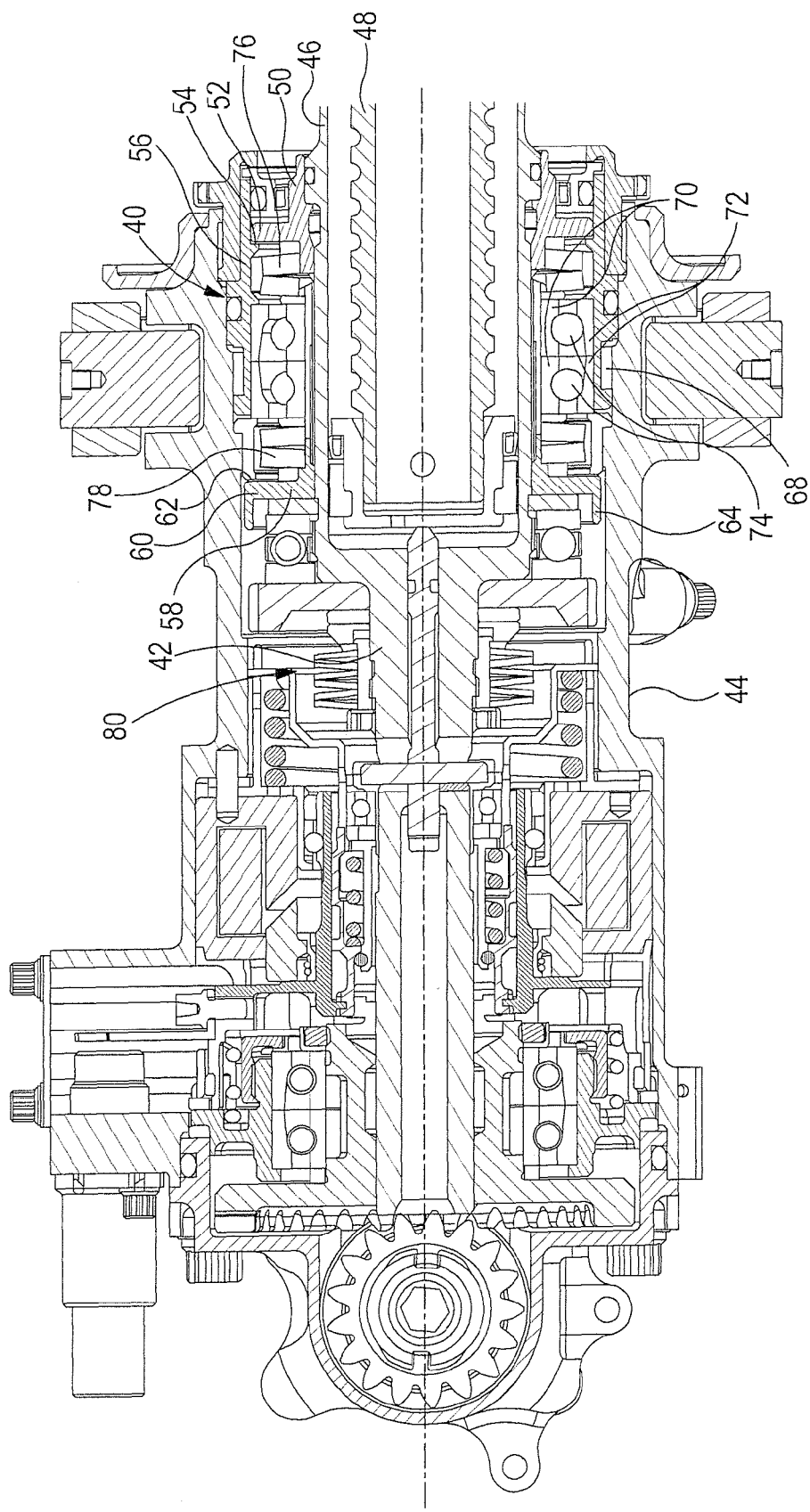
FIG. 2 is a sectional view illustrating part of one of the actuators of the arrangement of FIG. 1.

In the arrangement illustrated, the first and second actuators 16a, 16b are conveniently of the form illustrated in FIG. 2. The actuator shown in FIG. 2 comprises a rotatable actuator member 42 supported for rotation within a housing 44. The actuator member 42 includes a region 46 of tubular form having, at an end thereof, a threaded nut (not shown) secured through a ball or roller-screw coupling to a threaded output shaft 48. The output shaft 48 is secured to the associated mounting 20 in such a manner that the output shaft 48 is unable to rotate. It will be appreciated that, in use, rotation of the actuator member 42 under the control of the electric motor 18 results in axial displacement of the output shaft 48 relative to the housing 44, and thus results in displacement of the cowl 10, in use.

The load limiter device 40 is interposed between the tubular part 46 of the rotary actuator member 42 and the housing 44. The load limiter device 40 comprises a first stop member 50 which is secured to the rotary actuator member 42 so as to be rotatable therewith and to be axially fixed relative to the rotary actuator member 42, in use, by being abutted against a shoulder formed thereon. A key, spline or other connection arrangement may be used to ensure that rotary movement of the first stop member 50 relative to the rotary actuator member 42 is not permitted. The first stop member 50 includes a radially outwardly extending flange 52 which, in the position illustrated in FIG. 2, is spaced by a small distance from an abutment surface 54 of an abutment member 56 rigidly secured to the housing 44.

A second stop member 58 is also secured to the rotary actuator member 42 in such a manner that rotary movement thereof relative to the actuator member 42 is not permitted. This is conveniently achieved by a spline, key or other similar coupling. The second stop member 58 includes a radially outwardly extending flange 60 which in the position illustrated in FIG. 2 is spaced by a small distance from a second abutment surface 62 of an abutment member 64 also rigidly secured to the housing 44.

Figure 3:
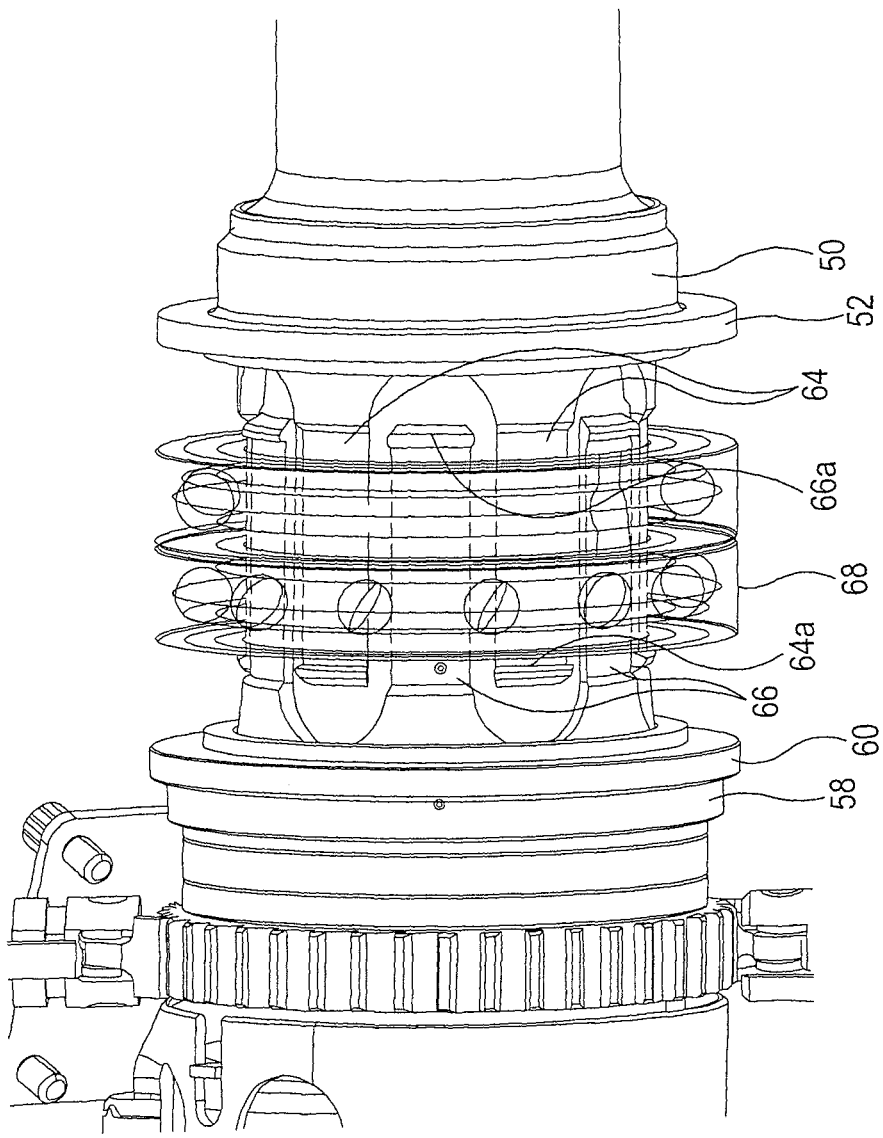
FIG. 3 illustrates part of the load limiter of the actuator of FIG. 2.

As best shown in FIG. 3, the first stop member 50 includes a series of fingers 64 which are interleaved with similar fingers 66 provided on the second stop member 58. Bearing means 68 encircle the fingers 64, 66, the bearing means 68 comprising inner races 70 supported on the fingers 64, 66 for rotation therewith, outer races 72 secured to the fixed abutment member 56, and ball bearings 74 located therebetween.

The fingers 64, 66 are provided, at their free ends, with outwardly extending lips 64a, 66a which are engageable with the inner races 70 to hold the first and second stop members 50, 58 captive to the bearing means 68.

Resilient biasing means in the form of the first and second spring packs 76, 78 are located between the flanges 52, 60 of the first and second stop members 50, 58, respectively, and the bearing means 68. The biasing means urges the second stop member 58 against a no-back device 80 secured to the actuator member 46, and the first stop member 50 against the associated shoulder on the actuator member 46. The first and second disc spring packs 76, 78 may have different spring rates to provide different overload tensile and compressive limit settings for the load limiter device 40.

In normal use, the biasing means serves to hold the rotary actuator member 46 in a substantially fixed axial position relative to the housing 44, the bearing means 68 supporting the actuator member 46 for rotation.

Figure 4:
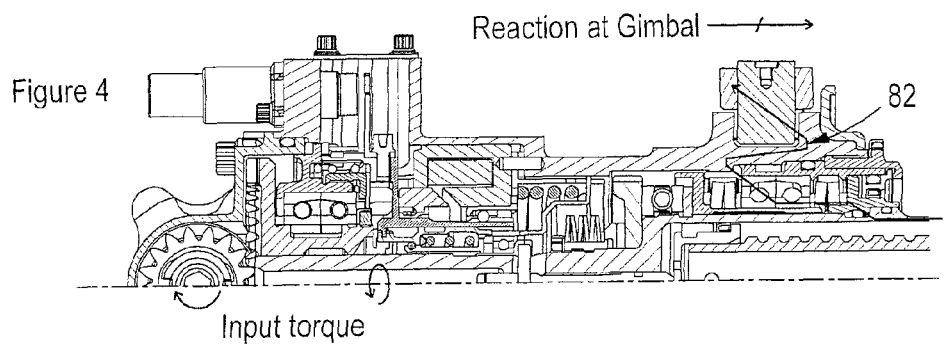
FIGS. 4 to 7 are diagrams illustrating various operating conditions of the actuator of FIG. 2.
Figure 5:
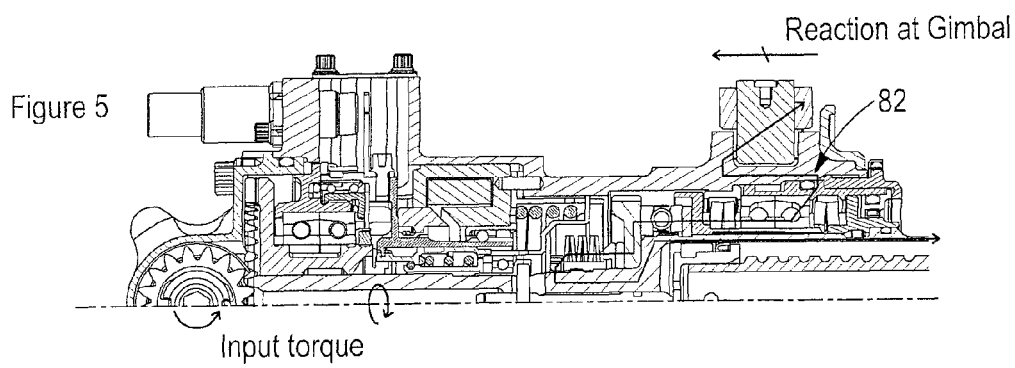

If, during movement of the cowl 10 the actuator 16a or 16b is under compression or tension at levels sufficiently low that the accompanying axial movement of the actuator member 46 against the net biasing load applied by the biasing means does not result in co-operation between either of the stop members 52, 58 and the associated abutment surfaces 54, 62, then the compressive or tensile load is reacted through the biasing means and bearing means 68 to the housing 44, but the load limiter device 40 does not operate to resist rotation of the actuator member 46. These operating conditions are illustrated in FIGS. 4 and 5, FIG. 4 illustrating the load path 82 by which compressive loads are reacted to the housing and FIG. 5 illustrating the load path 84 by which tensile loads are reacted to the housing.

Figure 6:
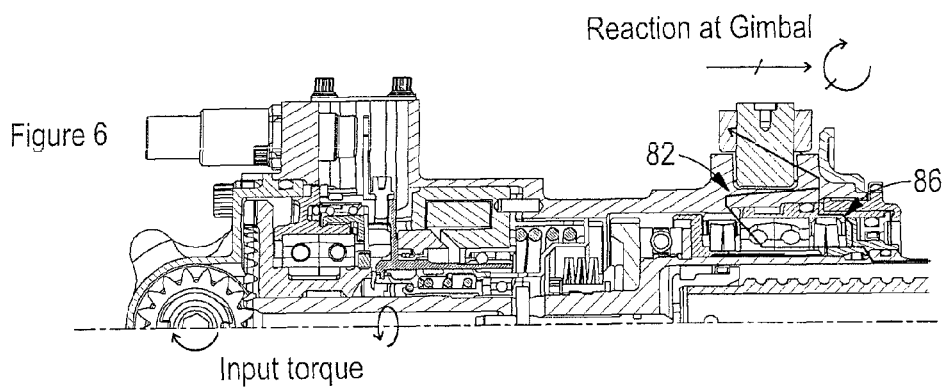

If larger compressive or tensile loads are experienced, sufficient to cause significant axial movement of the actuator member 46 relative to the housing 44 against the action of the biasing means then the load limiter device 40 will operate to react torque between the actuator member 46 and the housing 44. The spring packs 76, 78 are sized so as to ensure that, during normal deployment conditions, such axial movement does not occur, but that if loads higher than those normally experienced during deployment occur, then axial movement of this degree occurs. FIG. 6 illustrates the case where a large magnitude compressive load is experienced, as would occur in the failure mode outlined hereinbefore. In such a situation, the compressive load is sufficient to move the actuator member 46 to the left, in the orientation illustrated, against the net biasing load applied by the biasing means to a position in which the flange 52 of the first stop member 50 abuts the first abutment surface 54 of the abutment member 56 which is secured to the housing. As the first stop member 50 is, effectively, axially and rotationally fixed to the actuator member 46, the co-operation between the flange 52 and the first abutment surface 54 serves to react both input torque and additional compressive loads between the actuator member 46 and the housing 44. This load path is identified in FIG. 6 as load path 86, and it will be apparent that this load path is in addition to the load path 82.

Figure 7:
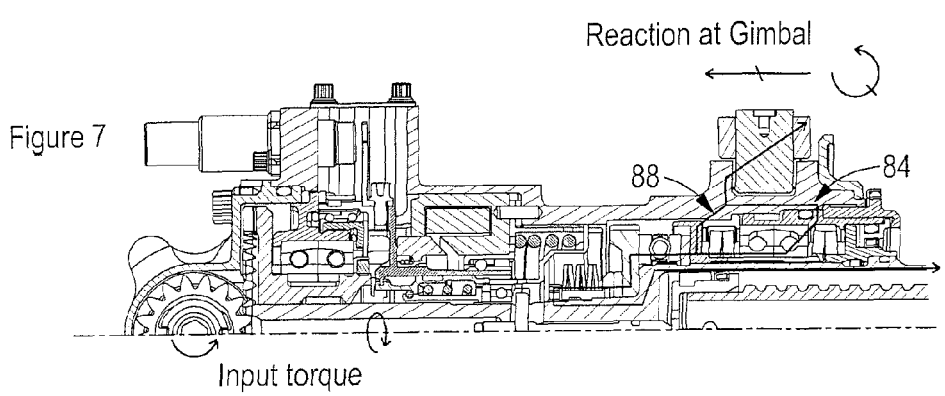

FIG. 7 illustrates the case where a large tensile load is applied, illustrating a load path 88 which serves, in addition to load path 84, to react tensile loadings, and additionally to react torque loadings to the housing 44. If a track jam, failure or obstruction is encountered during retraction of the cowl 10, then the load limiter device 40 will operate to avoid the application of excessive stresses to the actuator mounting points. Consequently, the risk of damage is again reduced.

In both cases, as torque is reacted or earthed to the housing 44, it will be appreciated that the load limiter device 40 operates as a brake, resisting rotation of the actuator member 46 when the tensile load or compressive load exceeds a predetermined level. As a result, the application of excessive compressive loads via the output shaft 48 as would otherwise occur in the failure mode outlined hereinbefore is avoided and so the risk of permanent damage to the actuator is reduced. It will be appreciated that this manner of operation is quite different to the operation of a torque limiter which releases upon the application of an excessive torque thereto.

The specific form of load limiter device 40 illustrated in FIGS. 2 to 7 is advantageous in that, as the first and second stop members are held captive to the bearing means, the load limiter device 40 can be pre-assembled and tested as a module prior to mounting on the actuator. However, the invention is not restricted to the use of this specific type of load limiter device.

It will be appreciated that by using such load limiters, it may be possible to use actuators of reduced size, weight and strength without unnecessarily increasing the risk of component failure, and that the strength, and hence size and weight, of the track lock may also be reduced without any reduction in the overall performance and/or safety of the system.

The arrangement described hereinbefore is merely one embodiment of the invention and it will be appreciated that a wide range of modifications and alterations may be made without departing from the scope of the invention.

The invention claimed is:

1. A thrust reverser drive arrangement for use in driving a thrust reverser cowl for movement relative to first and second guide tracks, the drive arrangement comprising a first actuator located, in use, close to the first guide track, and a second actuator located, in use, close to the second guide track, the actuators being arranged to be driven axially in synchronism and at the same speed by a drive motor to drive the cowl for movement, wherein at least one of the first and second actuators is provided with a load limiter operable to apply a braking load to limit the transmission of loads through that actuator in the event that that actuator is subject to a compressive loading greater than a predetermined level, the load limiter being operable to apply a braking load to the actuator member to resist rotation thereof, thereby reacting applied torque to a housing of the actuator rather than increasing the axial compression of the output member;

wherein at least one of the actuators comprises a rotatable actuator member, rotatable by the drive motor, in use, the rotatable actuator member being coupled through a ball or roller-screw coupling to an output member, rotation of the actuator member driving the output member for axial movement; and wherein the load limiter comprises a bearing supporting the actuator member for rotary motion relative to the housing, a resilient biasing element permitting limited axial movement of the actuator member in the event of the application of excessive loadings to the actuator, and an abutment element co-operable in the event of axial movement of the actuator member beyond a predetermined distance to transmit torque loadings between the actuator member and the housing.

2. An arrangement according to claim 1, wherein the abutment element comprises a first stop member secured, in use, to the actuator member and co-operable with a first abutment surface associated with the housing, and a second stop member secured, in use to the actuator member and co-operable with a second abutment surface associated with the housing.

3. An arrangement according to claim 2, wherein the bearing is located between the first and second stop members.

4. An arrangement according to claim 3, wherein the resilient biasing element comprises first and second disc spring packs interposed between the bearing and the first and second stop members, respectively.

5. An arrangement according to claim 2, wherein the first and second stop members are each provided with fingers, the fingers of the first stop member being interleaved with those of the second stop member, the bearing encircling the fingers, each finger including a lip at its free end co-operable with the bearing to hold the first and second stop members captive to the bearing.

6. An arrangement according to claim 2, wherein both the first actuator and the second actuator are provided with a load limiter.

7. An arrangement according to claim 2, wherein excess loadings are reacted through a housing of the first or through a housing of the second actuator.

* * * * *